United States Patent
Chevalier et al.

(10) Patent No.: US 12,397,271 B2
(45) Date of Patent: Aug. 26, 2025

(54) APPARATUS COMPRISING A HYGIENIC COOLING SYSTEM AND METHOD

(71) Applicant: SOCIETE DES PRODUITS NESTLE S.A., Vevey (CH)

(72) Inventors: Jean-Francois Chevalier, Courtonne la Meurdrac (FR); Rafael Marcilla, Issy les Moulineaux (FR)

(73) Assignee: Societe des Produits Nestle S.A., Vevey (CH)

( * ) Notice: Subject to any disclaimer, the term of this patent is extended or adjusted under 35 U.S.C. 154(b) by 299 days.

(21) Appl. No.: 18/003,519

(22) PCT Filed: Jun. 28, 2021

(86) PCT No.: PCT/EP2021/067664
§ 371 (c)(1),
(2) Date: Dec. 28, 2022

(87) PCT Pub. No.: WO2022/002837
PCT Pub. Date: Jan. 6, 2022

(65) Prior Publication Data
US 2023/0241564 A1    Aug. 3, 2023

(30) Foreign Application Priority Data
Jul. 1, 2020   (EP) .................................... 20183478

(51) Int. Cl.
*B01F 27/27*   (2022.01)
*A23P 30/40*   (2016.01)
(Continued)

(52) U.S. Cl.
CPC ........... *B01F 27/2711* (2022.01); *A23P 30/40* (2016.08); *B01F 23/2351* (2022.01);
(Continued)

(58) Field of Classification Search
CPC .. A23P 30/40; B01F 23/2351; B01F 27/2711; B01F 35/92; B01F 2035/98; B01F 2101/07
(Continued)

(56) References Cited

U.S. PATENT DOCUMENTS

2016/0230138 A1*   8/2016   Damren .................. F28D 7/024

FOREIGN PATENT DOCUMENTS

CN   107824100 A  *  3/2018
JP   S59166231 A      9/1984
(Continued)

OTHER PUBLICATIONS

English Machine Translation of CN 107824100 A (Year: 2018).*
Japanese Office Action for Appl No. 2022-577393 dated Sep. 17, 2024, 4 pages.

*Primary Examiner* — Charles S Bushey
(74) *Attorney, Agent, or Firm* — K&L Gates LLP

(57) ABSTRACT

An apparatus for mixing a liquid or pasty product. The apparatus includes a first housing part (11) and a second housing part (12) assembled together. The assembly of the first housing part (11) and the second housing (12) part forms •—a housing inner space (17) between an inlet (4) and an outlet (5), •—a cooling jacket (7) for circulation of a coolant fluid around the housing inner space (17), and •—a buffer jacket (9) for circulation of a clean fluid, the buffer jacket (9) being formed between the cooling jacket (7) and the housing inner space (17). The buffer jacket protects the mixed product from contamination by the coolant fluid. It also facilitates detection of leakage between the housing inner space and the buffer jacket. The invention also relates to a corresponding method.

14 Claims, 6 Drawing Sheets

(51) Int. Cl.
    *B01F 23/235*     (2022.01)
    *B01F 27/271*     (2022.01)
    *B01F 35/92*     (2022.01)
    *B01F 35/90*     (2022.01)
    *B01F 101/07*     (2022.01)

(52) U.S. Cl.
    CPC .......... *B01F 35/92* (2022.01); *B01F 2035/98* (2022.01); *B01F 2101/07* (2022.01)

(58) Field of Classification Search
    USPC ....................................................... 261/152
    See application file for complete search history.

(56) References Cited

FOREIGN PATENT DOCUMENTS

| | | |
|---|---|---|
| JP | S62174627 U | 11/1987 |
| JP | H0660433 U | 8/1994 |
| JP | 2005164525 A | 6/2005 |
| WO | 2005054806 | 6/2005 |
| WO | 2017067965 | 4/2017 |
| WO | 2018197493 | 11/2018 |

\* cited by examiner

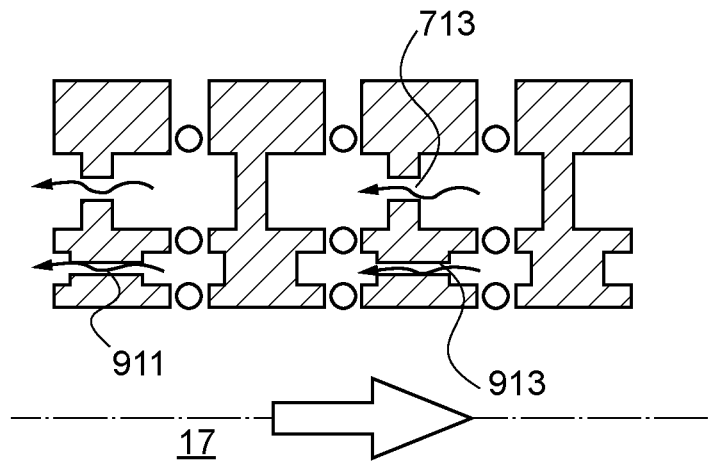
Fig. 5
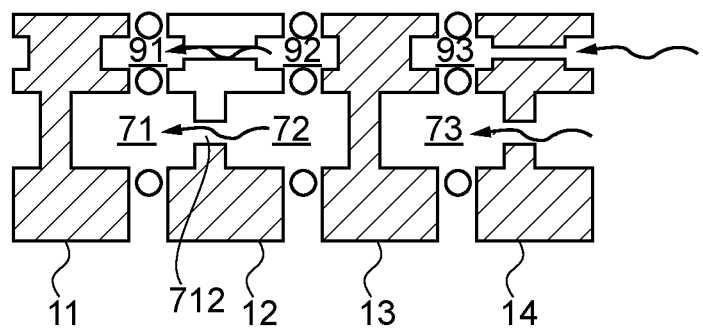
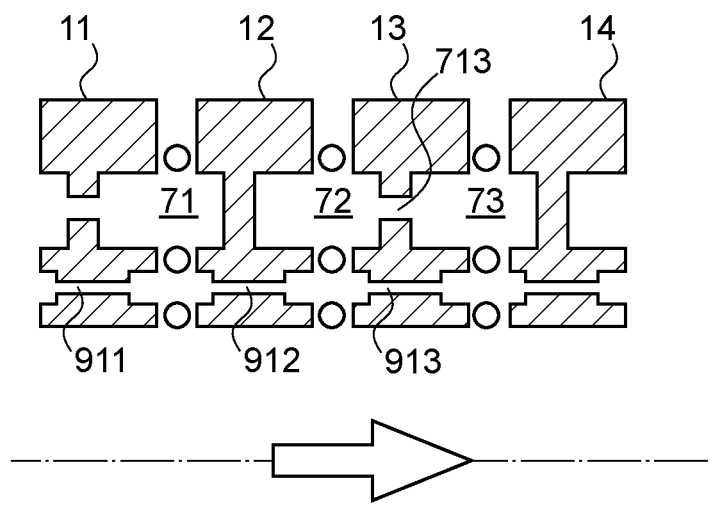
Fig. 6
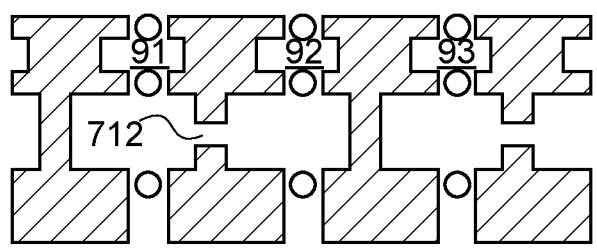

APPARATUS COMPRISING A HYGIENIC COOLING SYSTEM AND METHOD

CROSS REFERENCE TO RELATED APPLICATIONS

The present application is a National Stage of International Application No. PCT/EP2021/067664, filed on Jun. 28, 2021, which claims priority to European Patent Application No. 20183478.5, filed on Jul. 1, 2020, the entire contents of which are being incorporated herein by reference.

TECHNICAL FIELD

The present invention relates to an apparatus for mixing a liquid or pasty products, and to a method for mixing a liquid or pasty products. "Pasty" should be understood in a broad and non-restrictive manner. Pasty products comprise semi-liquid, viscous, and semi-solid products. For example, mousses (i.e. aerated food compositions) based on dairy products (i.e. milk food products), in the form of a foam obtained by whipping air or gas into a dairy base, are well known in the art. Their aerated texture is highly appreciated by consumers. The invention relates to the mixing of such products, in particular for the food and feed industry. It may also be applied in the pharmaceutical or cosmetic industry.

Mixing includes the homogenization of products and the combination of different products into a homogeneous product. Mixing also includes aeration of liquid or pasty products, i.e. the inclusion of small gas bubbles in to liquid or pasty products, generally resulting in a mousse.

BACKGROUND OF THE INVENTION

The most common industrially applied methods of mixing liquid and semi-liquids products are based on mechanical mixing. The commercially available machines vary somewhat in their design but the principles of their operation are generally similar. The mixing apparatus of most commercially available machines is of the rotor-and-stator type comprising a stainless steel rotor shaft covered with metal pegs which fit inside a tubular housing which forms a stator that also has pegs inside it. When the mixing apparatus is assembled the pegs on the shaft and on the inside of the apparatus intermesh to provide shear force on the product flow.

For aeration of a product, a liquid (or pasty) phase and a gas phase are combined before entering the mixing apparatus. The mixing apparatus mechanically disintegrates large gas bubbles into very small gas bubbles that are trapped within the product matrix. The bubble size is an essential factor that determines the product attributes.

Such machines are described for example in WO 91/07221 A1, GB 888 264 A and DE 31 27 684 A1.

WO 2013/068426 A1 discloses an apparatus for the aeration of food products comprising a mixing head having at least one set of a rotor and a stator. Each set of a rotor and a stator comprises a rotor and a stator with complementary toothed rims which are oppositely orientated in the axial direction. An inlet cover is provided having a product inlet opening for receiving a product to be aerated and a gas injector arranged thereon and traversing the inlet cover such that the head of the gas injector is located in a headspace defined by the inlet cover and a first rotor-stator set.

Improvements to such an apparatus are disclosed in WO 2017/067965 A1 and WO 2018/197493 A1.

More particularly, WO 2017/067965 A1 discloses an apparatus comprising an inlet for injecting a composition to be mixed with the food product between adjacent pairs of a rotor and a stator. This makes it possible to produce aerated products such as mousses, with inclusions of another product such as edible grains, chips or particles.

WO 2018/197493 A1 discloses an apparatus, which can be adapted easily to the production of a wide range of products. This apparatus comprises an intermediate mixing chamber provided with a first and a second set of a rotor and a stator, and a secondary product introduction means that issues into the intermediate mixing chamber. This apparatus is for example suitable for aerating base products having different properties mixed with different kinds of secondary products (gas, liquid, semi-liquid, solid pieces, or combination thereof, including products whose properties change when they are introduced into the aerated base product).

The mixing head of such mixing apparatuses thus comprises the set or sets of a rotor and a stator. Each stator is generally formed by a housing of the apparatus, i.e. the stator is integral with the housing. When the product to be aerated flows in such apparatuses, it must generally be and remain cold. The housing thus generally defines a space for circulation of a coolant fluid, generally ice-cold water, around the mixing head. An ice-cold water jacket, also named cooling jacket, is thus formed around the rotors of the apparatus and around the product stream.

The circulation of a coolant fluid makes it possible to remove heat energy generated by the shear forces derived from rotation speeds inside the apparatus. Advantageously, this improves the mixing operation, for example by achieving aerated products with enhanced overrun and stability. The temperature of the coolant fluid is adapted depending on the product to be mixed, and the desired properties of the mixed product, e.g. the aeration properties for the aerated product.

In the rest of the present document, the invention is exemplified by an apparatus using ice-cold water as coolant fluid. While cold water (e.g. ice-cold water) is the preferred coolant fluid, other coolant fluids can be used, including glycolated water. Also, although the term "aerated" is used to designate a product in which gas bubbles have been formed, gases other than air can be used for "aeration".

The ice-cold water stream circulates in a closed circuit passing in the housing of the apparatus, in particular around the stators of the mixing head. The apparatus, and in particular the mixing head, is formed of several parts. It may comprise several housing parts. For example, each housing can form one of an inlet part, an outlet part, and a stator of a stator and rotor set. Especially, the apparatus may comprise several stator and rotor sets. Seals, such as O-rings, are used to provide a seal between several parts of the apparatus.

Leaks must be avoided between parts of the apparatus for hereafter-detailed reasons.

An inner seal avoids leakage between the housing inner space and the cooling jacket. The housing inner space is the space formed between the inlet and the outlet of the apparatus, in which the food product stream flows. Especially, the housing inner space comprises the space defined inside each stator in which said food product stream flows. This inner seal must therefore ensure gas/liquid-tightness.

An outer seal avoids leakage between the cooling jacket and the ambient air that surrounds the apparatus. This outer seal must therefore ensure gas/liquid-tightness.

Means are provided to detect such leakage. In particular, the pressure of ice-cold water is measured by an automated system at the start-up of the apparatus. A failure of a seal (e.g. a leakage) may be identified by the automated system that measures the pressure of the ice-cold water.

If the automated system detects a decrease in the pressure of the ice-cold water below a given level, the machine is stopped. This indeed means that there may be a fault relating to the seal, and a leakage of the food product and/or of the ice-cold water may occur.

In case of a leakage at an inner seal, the food product stream would flow into the ice-cold water stream. This is because the pressure of the product stream is generally higher than the pressure of the ice-cold water stream. Such a leakage cannot be identified by visual inspection because the ice-cold water stream circulates in a closed circuit. Such a leakage can only be identified by measuring an unattended rise in the pressure of the ice-cold water stream at the start-up of the machine.

In case of a leakage at an outer seal, the ice-cold water will flow out of the apparatus housing. Such a leakage may be detected by visual inspection depending on the extent of the leakage, as ice-cold water flows out of the apparatus. When the apparatus is in operation, the automated system cannot measure the pressure of the ice-cold water. This is because the pressure is measured according to a particular process, which implies simultaneously closing a valve upstream and a valve downstream of the apparatus. This process is necessary due to the great pressure fluctuations in the water system of a factory, and cannot be performed when the apparatus is in operation. Consequently, if a leakage at an inner seal occurs when the apparatus is in operation, this leakage cannot be detected using the measurement process. Such a leakage cannot be detected by a visual inspection either, because the ice-cold water stream circulates in a closed circuit.

Moreover, when the machine is stopped, (e.g. at the end of the production of a batch of product) the pressure in the food product chamber inside the stator(s) decreases. Therefore, if a leakage occurs at an inner seal, some of the ice-cold water stream will flow into the food product stream. However, the ice-cold water is not suitable for consumption, e.g. is not sterile. Such a leakage of non-sterile water into the food product is not acceptable in terms of quality/hygiene standards.

If a leakage of ice-cold water into the product stream is detected, the full current batch of the food product has to be discarded. Hence, the apparatus according to the state of the art may also involve operational and cost issues.

The known apparatuses thus need to be improved to overcome the above described drawbacks. It is an object of the invention to provide an apparatus and a method for mixing food products that overcomes one or more disadvantages of the known systems.

SUMMARY OF THE INVENTION

The present invention relates to an apparatus for mixing a liquid or pasty product. The apparatus comprises a housing, said housing comprising an inlet for the liquid or pasty product to be mixed and an outlet for the mixed liquid or pasty product, and at least one set of a rotor and a stator for mixing the liquid or pasty product. The apparatus comprises at least a first housing part and a second housing part, the first housing part being assembled to the second housing part, the assembly of the first housing part and the second housing part forming a housing inner space between the inlet and the outlet where the liquid or pasty product flows. The assembly of the first housing part and the second housing part forms a cooling jacket for circulation of a coolant fluid around the housing inner space.

According to the invention the assembly of the first housing part and the second housing part also forms a buffer jacket for circulation of a clean fluid, the buffer jacket being formed between the cooling jacket and the housing inner space.

The buffer jacket formed between the cooling jacket and the housing inner space provides many advantages. Mainly, if a leakage of the clean fluid (e.g. sterile condensate water) towards the product stream occurs, the product mixed in the apparatus remains suitable for consumption (food product) or will not promote bacterial development in the product (food or cosmetic product).

Moreover, it allows an easy detection of some failures. For example, if a leakage of a food product into the clean fluid stream occurs, the food product will color the clean fluid. For example, for a dark chocolate mousse, the condensed water will be brownish in case of such leakage. Hence, simple visual inspection of the color of the clean fluid flowing out of the apparatus makes it possible to detect such leakage. In addition, if the clean fluid is water, it can be discarded, for example out of the apparatus, after it has flowed through the buffer jacket. A visual inspection is thus very easy to perform.

According to an embodiment of the invention:
an inner seal is interposed, at an interface between the first housing part and the second housing part, between the housing inner space and the buffer jacket,
a middle seal is interposed, at an interface between the first housing part and the second housing part, between the buffer jacket and the cooling jacket, and
an outer seal is interposed, at an interface between the first housing part and the second housing part, between the cooling jacket and ambient air outside the apparatus.

The presence of two successive seals, namely the middle seal and the inner seal, respectively between the cooling jacket and the buffer jacket, and between the buffer jacket and the housing inner space increases the operational safety of the apparatus. Furthermore, if a failure of one of the seals occurs, the negative consequences will be more easily mastered than before.

If a failure of the inner seal occurs, as above explained, the product to be mixed will color the clean fluid and this leakage will be easily detected. Moreover, if for any reason, the pressure in the housing inner space becomes lower than the pressure in the buffer jacket, clean fluid will flow into the product to be mixed. The product will be slightly diluted but this will not imply any safety issues.

If a failure of the middle seal occurs, clean fluid will flow into the cooling fluid. Such a leakage can be detected by measuring the pressure of the coolant fluid at start-up of the apparatus. If the leakage starts when the apparatus is in operation, it will not be immediately detected. However, there would not be any safety issues because the inner seal would be intact, and the product to be mixed would not be contaminated by coolant fluid.

If a failure of the outer seal occurs, the coolant fluid will flow out of the apparatus and the failure of the seal will be easily detected.

The buffer jacket can have an average thickness which is less than the average thickness of the cooling jacket.

The buffer jacket may be formed of a very thin layer of fluid. Its protective effect for the product to be mixed from a contamination by cooling fluid does not imply a large flow of fluid in the buffer jacket. This limits, if applicable, the quantity of water discarded from the apparatus. Moreover, the buffer jacket must not impair the heat transfer between the coolant fluid and the product which flows in the housing inner space.

The housing inner space can be generally cylindrical, the buffer jacket can have ring-shaped cross section and surrounds the housing inner space, and the cooling jacket can have a ring-shaped cross section and surrounds the buffer jacket.

A cylindrical general shape is convenient, because of the shape of the stator and rotor sets used in the apparatus. It is also the shape that is the most easy to implement in such system, for many reasons: pressure resistance, easy provision of ring-shaped seals such as O-rings, etc.

The apparatus can further comprise a third housing part, such that:
  the assembly of the first housing part and the second housing part forms a first portion of the buffer jacket, and
  an assembly of the second housing part and the third housing part forms a second portion of the buffer jacket;
and wherein the first portion of the buffer jacket is in fluid communication with the second portion of the buffer jacket.

The apparatus can be configured so that a stream of clean fluid is established all around the housing, a second hole forming the inlet of the first portion of the buffer jacket and the outlet of the second portion of the buffer jacket, said second hole being radially opposite a first hole forming the outlet of the first portion of the buffer jacket, and said second hole being radially opposite a third hole forming the inlet of the second portion of the buffer jacket.

In such embodiment, each portion of the buffer jacket can comprise a barrier, an inlet in each portion of the buffer jacket being situated next to the barrier, on one side of said barrier and an outlet of that portion of the buffer jacket being situated on the other side of said barrier.

Measures are thus taken to ensure good temperature uniformity in the apparatus, as well as a continuous and homogeneous flow allowing the detection of certain failures as detailed above.

The apparatus can comprises a plurality of sets of a rotor and a stator, each stator being provided in a separate housing part of the apparatus, each housing part in which a stator is formed being assembled to at least one adjacent housing part.

In fact, the apparatus generally comprises more than two housing parts. It generally comprises an inlet housing part, forming the entrance into the apparatus for the product to be mixed, an outlet housing part, forming the exit from the apparatus for the mixed product, and several intermediate housing parts interposed between the inlet housing part and the outlet housing part, each intermediate housing part comprising a set of a rotor and a stator.

The invention also relates to a system comprising an apparatus as above described, wherein the system further comprises:
  a source of coolant fluid providing cooling fluid to the cooling jacket; and
  a source of clean heat-conducting fluid providing clean heat-conducting fluid to the buffer jacket.

The source of coolant fluid can be a coolant closed circuit comprising a cooling device configured to cool the coolant fluid flowing from an outlet of the cooling jacket thus forming cooled coolant fluid and to provide the so obtained cooled coolant fluid to an inlet of the cooling jacket.

In such system, the clean fluid can flow in an open circuit.

Clean fluid discarded from the open circuit can be used for leak detection. For example, a change in color of the discarded clean fluid caused by a leak of the mixed product into the clean fluid can be easily detected by simple visual inspection.

The clean fluid can be condensate water.

Condensate water is the preferred clean conductive fluid used in a system according to the invention because it is easy to obtain, it is food grade, sterile, and it thus might be mixed, in case of the inner seal failure, with any product, for example any food product, without safety issue, and without substantially changing the properties of the product, for example its taste, as long as the leakage remains small.

The source of clean fluid can comprise a steam production circuit and a condenser. The condenser can be configured for heat exchange between steam issued from the steam production circuit and the coolant fluid.

The invention also relates to a method of mixing a liquid or pasty product comprising passing a stream of liquid or pasty product to be mixed through the apparatus of a system as above described, and mixing the stream of liquid or pasty product with at least a set of a rotor and a stator, wherein the stator and consequently the liquid or pasty product is cooled by heat transfer with the coolant fluid flowing in the cooling jacket.

BRIEF DESCRIPTION OF THE DRAWINGS

FIG. 5 is a schematic representation of an assembly of several stators of sets of a rotor and a stator that can be used in the invention;

FIG. 6 is a schematic representation of another assembly of several stators of sets of a rotor and a stator that can be used in the invention;

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

As used in this specification, the words "comprises", "comprising", and similar words, are not to be interpreted in an exclusive or exhaustive sense. In other words, they are intended to mean "including, but not limited to".

The invention is further described with reference to the illustrated example embodiments. It will be appreciated that the invention as claimed is not intended to be limited in any way by these examples.

Figure 1:
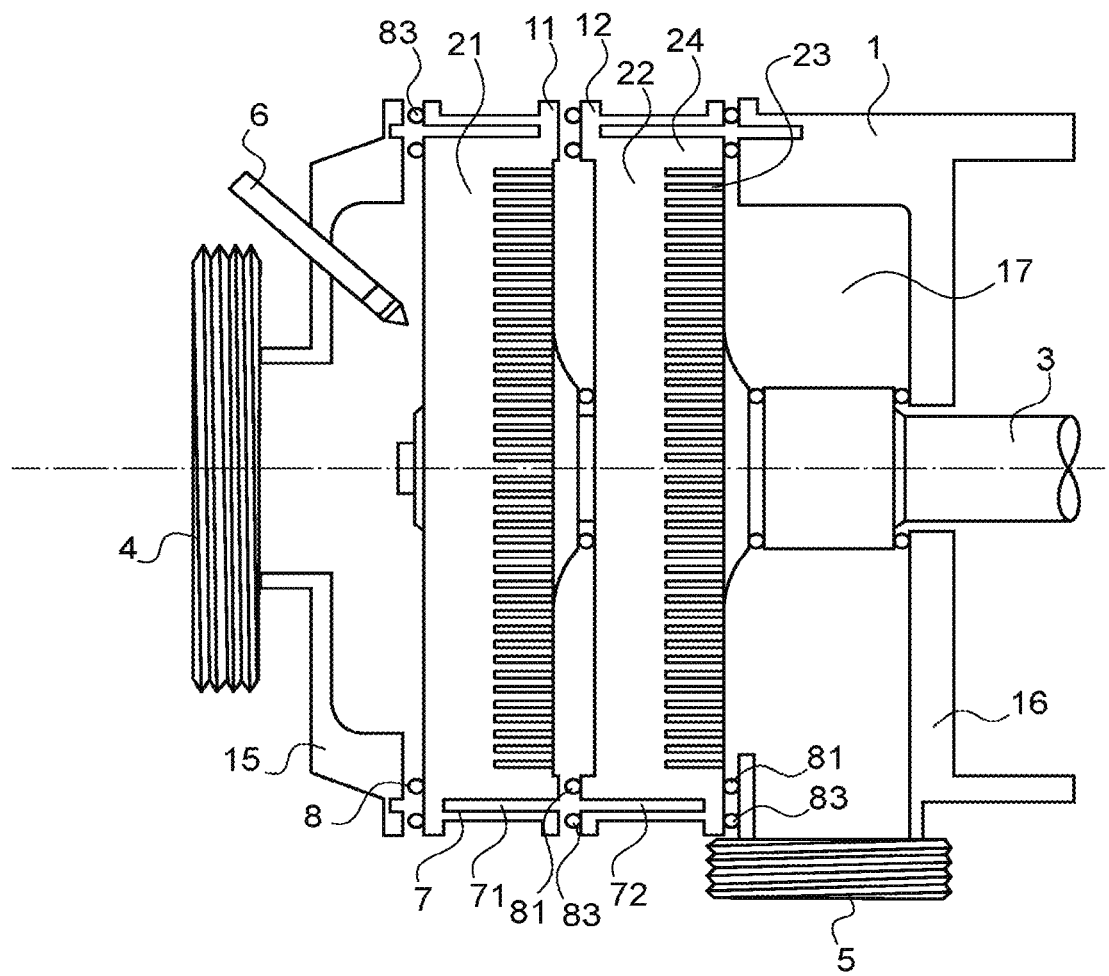
FIG. 1 is a schematic cross-sectional schematic representation of an example apparatus for mixing a liquid or pasty product as known in the prior art, which may be improved according to the present invention.

FIG. 1 is a schematic cross-sectional representation of an example apparatus for mixing a liquid or pasty product as known in the prior art. This is the type of apparatuses, which may be optimized as proposed in the invention.

The apparatus of FIG. 1 is shown in a horizontal configuration, but an identical or similar apparatus can also have a vertical configuration. It is the same for the apparatuses according to the invention.

The represented example apparatus for mixing a liquid or pasty product comprises a housing 1, comprising two sets of a rotor and a stator 21, 22. In the represented embodiment, each rotor is integral with the housing. The first set of a rotor and a stator 21 is upstream of the second set of a rotor and a stator 22, with respect to the general direction of the product flow in the apparatus, from a product inlet 4 to a mixed product outlet 5. The rotors have one or more toothed rims which cooperate with complementary toothed rims on the stators which are oppositely orientated in the axial direction.

In the represented embodiment, the housing 1 has a substantially tubular form, i.e. a substantially cylindrical general shape. The housing 1 extends in a longitudinal direction. The sets of a rotor and a stator 21,22 are aligned in series along a central drive shaft 3, extending in the longitudinal direction along a central longitudinal axis A.

Each set of a rotor and a stator 21,22 comprises a rotor 23 and a corresponding stator 24. The rotors 23 are coupled to the drive shaft 3 and driven in rotation around the central longitudinal axis (A) of the drive shaft 3 by a motor drive (not shown) coupled to the shaft 3. Typical rotation speeds of the drive shaft 3 are from 50 RPM to 1500 RPM. The stators are rigidly coupled to (or formed integrally with) the internal wall of the housing 1 so as to form a single piece, that is to say that the housing forms the stator of each stator and rotor sets.

In this example prior art embodiment, the apparatus has a product inlet 4 provided in an inlet housing part 15. The product inlet 4 is configured for receiving a stream of a liquid or pasty (e.g. semi-liquid, viscous liquid or semi-solid) product to be mixed from a product feed-line (not represented). The represented prior art embodiment is configured for product aeration. A gas injector 6 is positioned in the inlet housing part for the introduction of gas under pressure into the apparatus. In general, gas may be injected into the mixing apparatus under a pressure in the range of from about 0.5 bars to about 10 bars. The position of the gas injector 6 is important for providing an efficient incorporation of the gas into the liquid or pasty product stream, e.g. for producing regular and uniform gas bubbles in the product stream. For example, the gas injector 6 may be positioned with its central axis parallel to the central longitudinal axis (A) of the drive shaft 3 or inclined at an angle from 10° to about 85° relative to said central longitudinal axis (A) of the drive shaft 3.

Gas entering the apparatus under pressure via the gas injector 6 flows onto the toothed rims of the first set of a rotor and a stator 21 and is subjected to the high shear and cutting forces provided by the toothed rims of the set of a rotor and a stator. The rotation of the rotors in each set of a rotor and a stator 21,22 pumps the product stream and the gas bubbles outwardly through the shear gaps between the rotor teeth and the stator teeth, creating a localized high shear condition. High shear forces exerted on the product stream in shear gaps between the rotor teeth and the stator teeth through which product flows provides homogenization of the product stream and the production of a homogenous aeration of the product stream, with small gas bubbles.

The housing 1 comprises a mixed (e.g. aerated) product outlet 5 for the mixed product, the outlet 5 being provided in an outlet housing part 16. Preferably, a back-pressure regulator (not illustrated) is provided in the product stream downstream of the mixed product outlet 5. The back-pressure regulator makes it possible to control the pressure in the inner space of the housing and ensures steady flow of the product through the mixing apparatus.

Each set of a rotor and a stator 21, 22, is provided in a separate housing part. The first set of a rotor and a stator 21 is provided in a first housing part 11. The second set of a rotor and a stator 22 is provided in a second housing part 12.

The apparatus for mixing a liquid or pasty product is obtained by assembling the housing parts along the longitudinal direction. The inlet housing part 15 is assembled to one end of the first housing part 11, the other end of the first housing part 11 is assembled to one end of the second housing part 12, and the other end of the second housing part is assembled to the outlet housing part 16.

Other configurations of apparatuses for mixing a product can be obtained according to a similar assembly, generally comprising:
- an inlet housing part 15,
- at least one housing part comprising a set of a rotor and a stator (e.g. up to eight sets of a rotor and a stator can be used in an apparatus);
- optionally, one or several spacers, i.e. a housing part without a set of a rotor and a stator, and
- an outlet housing part 16.

The assembly of the housing parts defines the housing inner space 17 in which the product flows from the product inlet 4 to the mixed product outlet 5.

The product to be mixed, for example aerated, may be a frozen product, such as ice cream premix or a cold product, such as cream, or more generally a food product that must be kept cold during mixing, e.g. during aeration (fermented dairy mousse premix, chocolate mousse premix, etc.). The movement of the rotors in the housing 1 may cause the temperature of the stators to rise, and may more generally cause the temperature in the inner space of the housing to rise. Such rise of the temperature may furthermore be caused by heat exchanges through the housing between its inner space and the ambient air around the apparatus.

A cooling system is thus generally provided around the housing 1, and consists in a hollow jacket, namely a cooling jacket 7. The cooling jacket defines a space for circulation of a coolant fluid. The coolant fluid is circulated in the cooling jacket in order to maintain a cold temperature, for example between −15° C. and 10° C., preferably between 0° C. and 10° C., in the product flowing through the apparatus.

The circulation of a coolant fluid thus makes it possible to dissipate the uptake of heat energy that is generated by the shear forces derived from rotation speeds inside the apparatus. Advantageously, this improves a mixing operation, especially an aeration operation, for example by achieving aerated products with enhanced overrun and stability. Advantageously, this helps to maintain the degree and stability of the aeration in the product. Any coolant fluid may be envisaged. Generally, water at cold temperature is used as coolant fluid. The temperature of the coolant or heating fluid can be adapted depending on the product to be mixed or the product to be aerated and the desired aeration properties for the aerated product.

Because the apparatus is obtained by an assembly of several parts, the cooling jacket 7 is also composed on the assembly of portions of the cooling jacket 7, respectively provided in each housing part. In the represented example, the first housing part 11 comprises a first portion of the cooling jacket 71, the second housing part 12 comprises a second portion of the cooling jacket 72. The cooling jacket portions are configured to organize the flow of a coolant fluid in the so-formed cooling jacket 7. For example, the apparatus can be configured so that the coolant fluid first enters the second portion of the cooling jacket 72 by a coolant fluid inlet provided in the outlet housing part 16, flows around the stator of second portion of the cooling jacket 72, then enters the first portion of the cooling jacket 71, and finally exits via a coolant fluid outlet provided in the inlet housing part 15. The circulation of the coolant fluid can be alternatively organized from the inlet housing part to the outlet housing part.

To avoid leakage of coolant fluid out of the apparatus, an outer seal 83, for example an O-ring, is interposed at the interface between each pair of adjacent housing parts. To avoid leakage of coolant fluid into the housing inner space 17 (and leakage of product from the housing inner space 17 into the cooling jacket 7), an inner seal 81, for example an O-ring, is also interposed at the interface between each adjacent housing part. Other closed shapes of seals can be used, depending on the general shape of the apparatus.

However, as above explained, a failure of the inner seal 81, for example due to wear or a bad position of the inner seal, may be difficult to detect, and will be detected only at startup of the apparatus. Such failure can have negative consequences such as rendering the product unsuitable for consumption.

Figure 2:
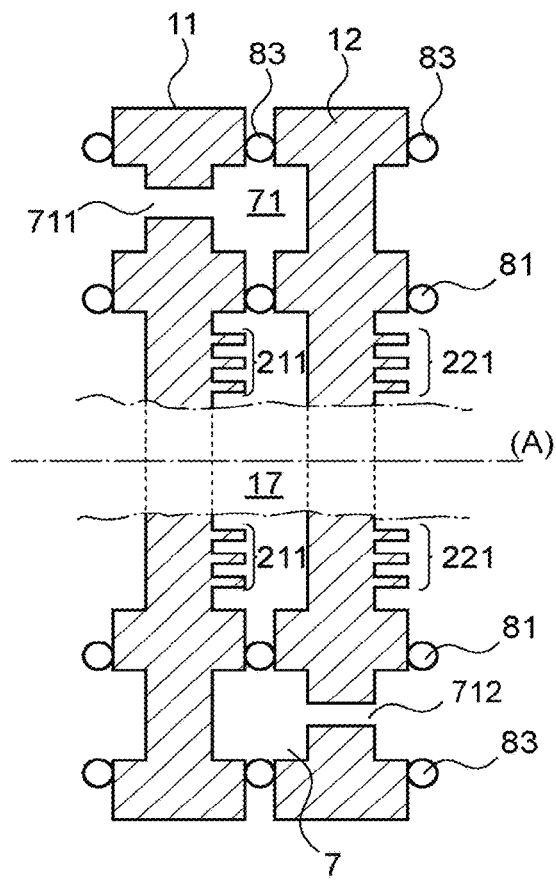
FIG. 2 is a schematic representation of an assembly of two housing parts of an apparatus for mixing a liquid or pasty product, according to the prior art.

FIG. 2 represents a schematic view of the seal arrangement between two housing parts, according to the prior art. More particularly, FIG. 2 represents, in a partial cross-sectional view, two adjacent stators formed in two successive housing parts. The first housing part 11 forms a first stator comprising a first set of teeth 211. The second housing part 12 forms a second stator comprising a second set of teeth 221.

In the represented embodiment, the assembly of the first housing part 11 with the second housing part 12 forms a first portion of the cooling jacket 71.

A first hole for coolant fluid 711 forms the coolant fluid outlet from the first portion of the cooling jacket 71 to a next portion of the cooling jacket 7. A second hole for coolant fluid 712 forms the coolant fluid inlet into the first portion of the cooling jacket 71 from a preceding portion of the cooling jacket 7.

Outer seals 83 provide a gas-tight and liquid-tight seal between the cooling jacket and the ambient air surrounding the apparatus. Inner seals 81 provide a liquid-tight (and also preferably gas-tight) seal between the cooling jacket and the housing inner space 17.

Figure 3:
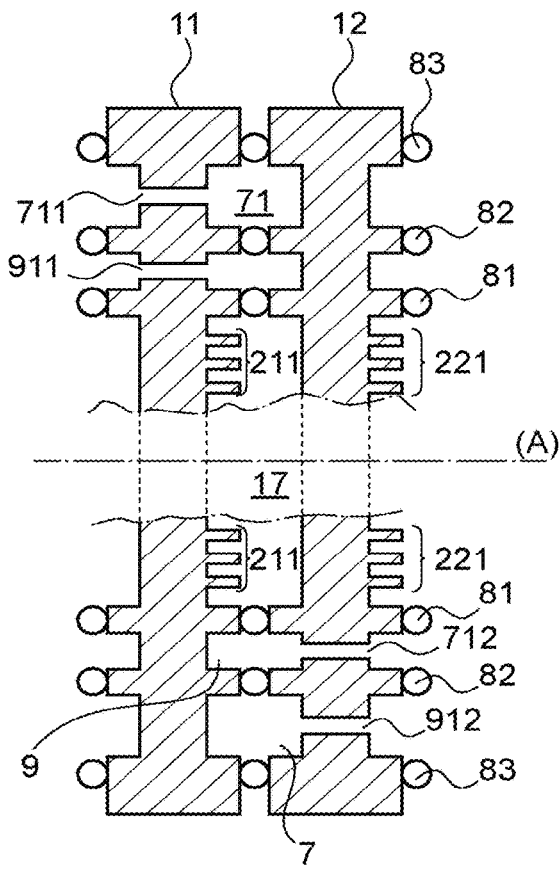
FIG. 3 is a schematic representation, in a view similar to that of FIG. 2, of an assembly of two housing parts of an apparatus for mixing a liquid or pasty product according to an example embodiment of the invention.

FIG. 3 represents a schematic view of the seals arrangement between two housing parts, according to an embodiment of the invention. The view of FIG. 3 is similar to the view presented in FIG. 2, and the above description applies to the apparatus of FIG. 3, except for the seal arrangement and the presence of a buffer jacket.

More particularly, the embodiment of FIG. 3 differs from the prior art embodiment of FIG. 2 in that a buffer jacket 9 is provided between the housing inner space 17 and the cooling jacket 7. In the represented embodiment, the assembly of the first housing part 11 with the second housing part 12 forms a first portion of the buffer jacket 91.

A first hole 911 forms an outlet from the first portion of the buffer jacket 91 to a next portion of the buffer jacket 9. A second hole 912 forms an inlet from a preceding portion of the buffer jacket into the first portion of the buffer jacket 91.

As in the prior art embodiment of FIG. 2, outer seals 83 provide a gas-tight and liquid-tight seal between the cooling jacket 7 and the ambient air surrounding the apparatus.

In the embodiment of the invention represented in FIG. 3, inner seals 81 provide a liquid-tight (and also preferably gas-tight) seal between the buffer jacket 9 and the housing inner space 17.

Furthermore, a middle seal 82, for example an O-ring, is interposed at the interface between each pair of adjacent housing parts, between the portion of the cooling jacket and the portion of the buffer jacket formed by the assembly of the two considered adjacent housing parts. The middle seal 82 avoids leakage between the buffer jacket 9 and the cooling jacket 7. The buffer jacket 9 is configured for the circulation of a clean, for example sterile, fluid such as condensed water. The clean fluid has to be heat conducting, in order not to limit the heat transfer between the stator and/or the housing inner space 17 and the coolant fluid present in the cooling jacket 7. By "clean", it is meant that the fluid will not render the mixed product unusable if a certain quantity of fluid is mixed into the product stream. The clean fluid can be a food-grade fluid, and/or sterile, etc.

The clean fluid must not limit, or must limit as little as possible, the thermal exchanges between the cooling jacket and the product to be mixed that flows in the apparatus. The clean fluid is thus advantageously a heat conducting fluid. Water or water based product (e.g. water with an adequate antifreeze agent) is generally appropriate.

Thanks to the buffer jacket 9 provided in the invention, the negative consequences of a failure of a seal are reduced, and/or the leakage detection is simplified.

If an inner seal 81 is defective, a leakage of food product into the clean fluid or a leakage of clean fluid in the food product may occur.

A leakage of the food product into the clean fluid stream will be easily detected thanks to the coloration of the clean fluid by the food product. Especially, the clean fluid stream does not circulate in a closed circuit but it flows in an "open circuit". By "open circuit", it is meant a fluid path that does not consist in a closed loop, but comprise at least one outlet from which the fluid flowing in the so-called open circuit is continuously discarded, and at least one inlet by which the amount of discarded fluid is compensated.

Especially, clean fluid is discarded out of the apparatus, for example, onto the floor (and then by sewers or a water recovery system). Hence, a leakage may be easily detected by visual inspection of the clean fluid which is discarded from the apparatus. Especially, the clean fluid discarded out of the apparatus will be colored by the product in case of a product leakage.

Parameters other than the color of the clean fluid could alternatively be used to detect such leakage.

In alternative embodiments of the invention, the liquid can be analyzed by a system configured to detect a change in its composition. Such detection can be performed by measuring for example one or several of the following parameters: conductivity, temperature, turbidity. A detection of a change in composition and therefore a change in such a parameter may thus be used, alternatively or as a complement to a change in color, to detect a leak.

A leakage of the clean fluid (e.g. condensate water) towards the food product stream will slightly dilute the mixed food product with clean fluid, but the food product remains suitable for consumption.

If a middle seal 82 is defective, clean fluid will flow into the cooling fluid. Such a leakage can be detected by measuring the coolant fluid pressure at start-up of the apparatus. If the leakage starts when the apparatus is in operation, there will not be any safety issues because the inner seal is intact. But above all, there is no contamination of the mixed food product by a foreign fluid.

If an outer seal 83 is defective, the coolant fluid will flow out of the apparatus and the failure of the seal will be easily detected as in the known apparatuses.

A contamination of the food product can only occur if both an inner seal 81 and a middle seal 82 are simultaneously defective, which is very unlikely. Any failure of one of an inner seal and a middle seal will most certainly be detected before both an inner seal and a middle seal become defective.

Figure 4:
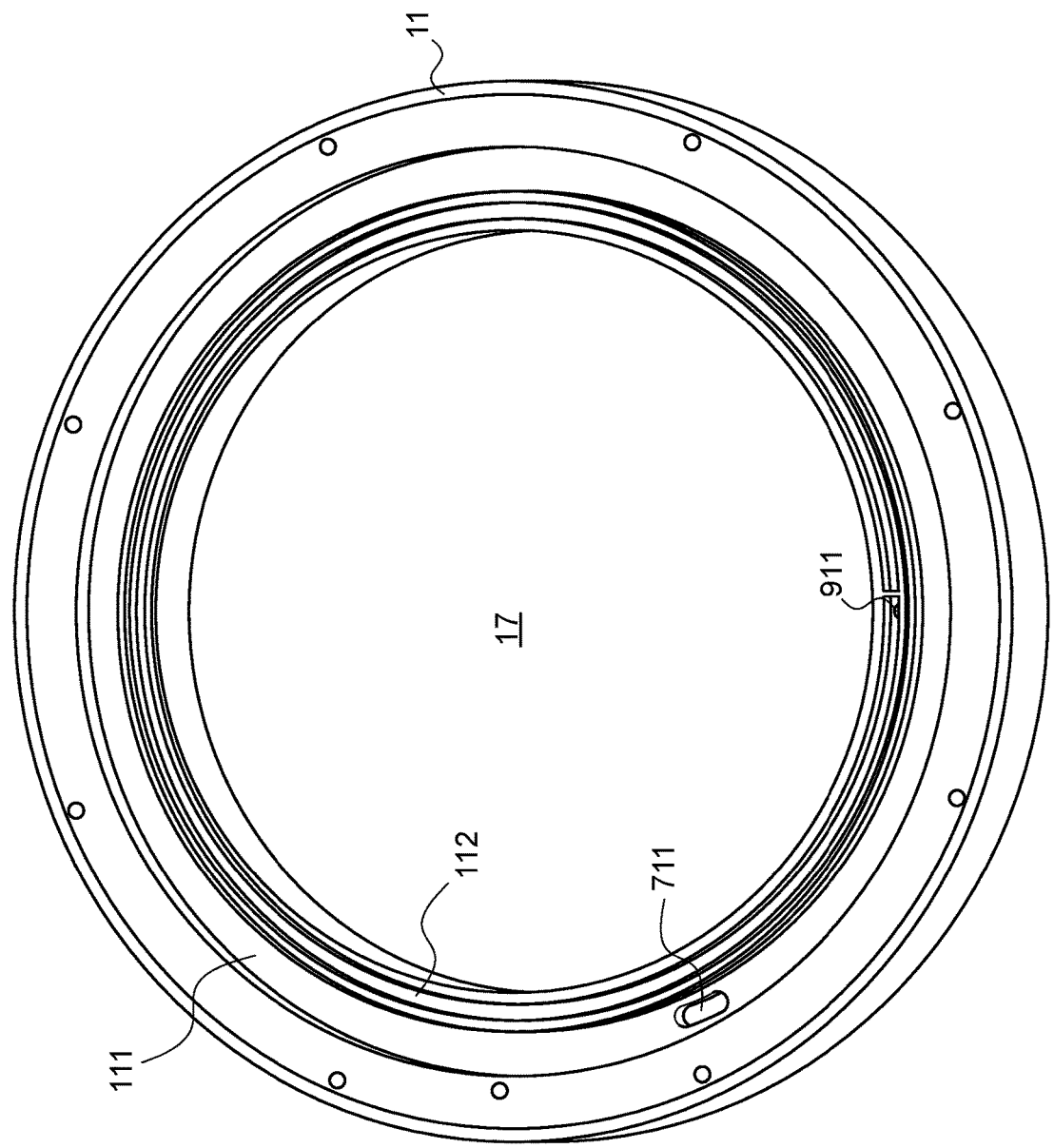
FIG. 4 is a three dimensional representation of a housing part forming a stator of a set of a rotor and a stator that can be used in an embodiment of the invention.

FIG. 4 is a three dimensional representation of a housing part forming a stator of a stator and rotor set that can be used in an embodiment of the invention. The three dimensional view of FIG. 4 shows how cooling jacket portions and buffer jacket portions can be formed by assembly of housing parts. The represented housing part, corresponding for example to a first housing part 11, has in the represented embodiment a general shape of a hollow cylinder. Because the housing part has a short height compared to its diameter, the represented embodiment of a housing part can be said to be ring-shaped.

The buffer jacket and the cooling jacket are provided in the housing of the apparatus, and are concentric. More particularly the housing inner space 17 is surrounded by the buffer jacket 8, which is surrounded by the cooling jacket 7.

A cooling jacket portion is formed by the assembly of two facing circular outer grooves of adjacent housing parts. The first housing part comprises a first outer groove 111.

Similarly, a buffer jacket portion is formed by the assembly of two facing circular inner grooves of adjacent housing parts. The first housing part comprises a first inner groove 112.

The first hole for coolant fluid 711 (i.e. coolant fluid outlet from the first cooling jacket portion 71) and the first hole 911 (i.e. clean fluid outlet from the first portion of the buffer jacket 91) are represented in FIG. 4. They are represented in more detail in FIG. 7 described hereafter, with reference to a particular embodiment of the invention.

Indeed, it is important to provide a configuration of the apparatus which promotes a coolant fluid stream in the cooling jacket all around each stator of the apparatus. Similarly, it is important to provide a configuration of the apparatus which promotes a clean fluid stream in the buffer jacket all around each stator of the apparatus.

This can be obtained, for example, according to two alternative configurations respectively represented in FIG. 5 and FIG. 6.

FIG. 5 is a schematic representation of an assembly of several stators of stator and rotor sets that can be used in the invention. The assembly of FIG. 5 comprises four stators, each stator being provided in a separate housing part. In particular, FIG. 5 represents the assembly of a first housing part 11, a second housing part 12, a third housing part 13, and a fourth housing part 14.

The assembly of the first housing part 11 with the second housing part 12 forms a first portion of the cooling jacket 71 and a first portion of the buffer jacket 91.

The assembly of the second housing part 12 with the third housing part 13 forms a second portion of the cooling jacket 72 and a second portion of the buffer jacket 92.

The assembly of the third housing part 13 with the fourth housing part 14 forms a third portion of the cooling jacket 73 and a third portion of the buffer jacket 93.

The product to be mixed flows, as represented in FIG. 5 by a large arrow, in the housing inner space 17 from the first housing part 11 to the fourth housing part 14. The coolant fluid and the clean fluid flow, in the represented embodiment, from the fourth housing part 14 to the first housing part 11.

The first portion of the cooling jacket 71 is in fluid communication with the second portion of the cooling jacket 72 through a second hole for coolant fluid 712. The second portion of the cooling jacket 72 is in fluid communication with the third portion of the cooling jacket 73 through a third hole for coolant fluid 713.

To establish a stream of coolant fluid all around each housing part, two successive holes for coolant fluid are radially opposite. In other words, the second hole for coolant fluid 712 is radially opposed to the third hole for coolant fluid 713.

A same configuration can be used, as represented in FIG. 5, to ensure that a stream of clean fluid is established all around the housing.

The first portion of the buffer jacket 91 is in fluid communication with the second portion of the buffer jacket 92 through a second hole for clean fluid 912. The second portion of the buffer jacket 92 is in fluid communication with the third portion of the buffer jacket 93 through a third hole for clean fluid 913.

To establish a stream of clean fluid all around each housing part, two successive holes for clean fluid are radially opposed. In other words, the second hole for clean fluid 912 is radially opposed to the third hole 913 for clean fluid (and so on).

The outlet of the first portion of the buffer jacket is formed by a first hole for clean fluid 911.

An alternative embodiment is represented in FIG. 6.

FIG. 6 is a schematic representation, similar to FIG. 5, of an assembly of several stators of stator and rotor sets that can be used in the invention. As in FIG. 5, the assembly comprises four stators, each stator being provided in a separate housing part.

The above description of FIG. 5 applies to the embodiment of FIG. 6, which differs from the embodiment of FIG. 5 by the arrangement of the holes for clean fluid between the buffer jacket portions.

According to the embodiment represented in FIG. 6, the second hole for clean fluid 912 is substantially aligned with the third hole for clean fluid 913. However, to avoid the passage of clean fluid directly from the third hole for clean fluid 913 to the second hole for clean fluid 912, a barrier 133 is formed in the second portion of the buffet jacket 92, as represented in FIG. 7.

Figure 7:
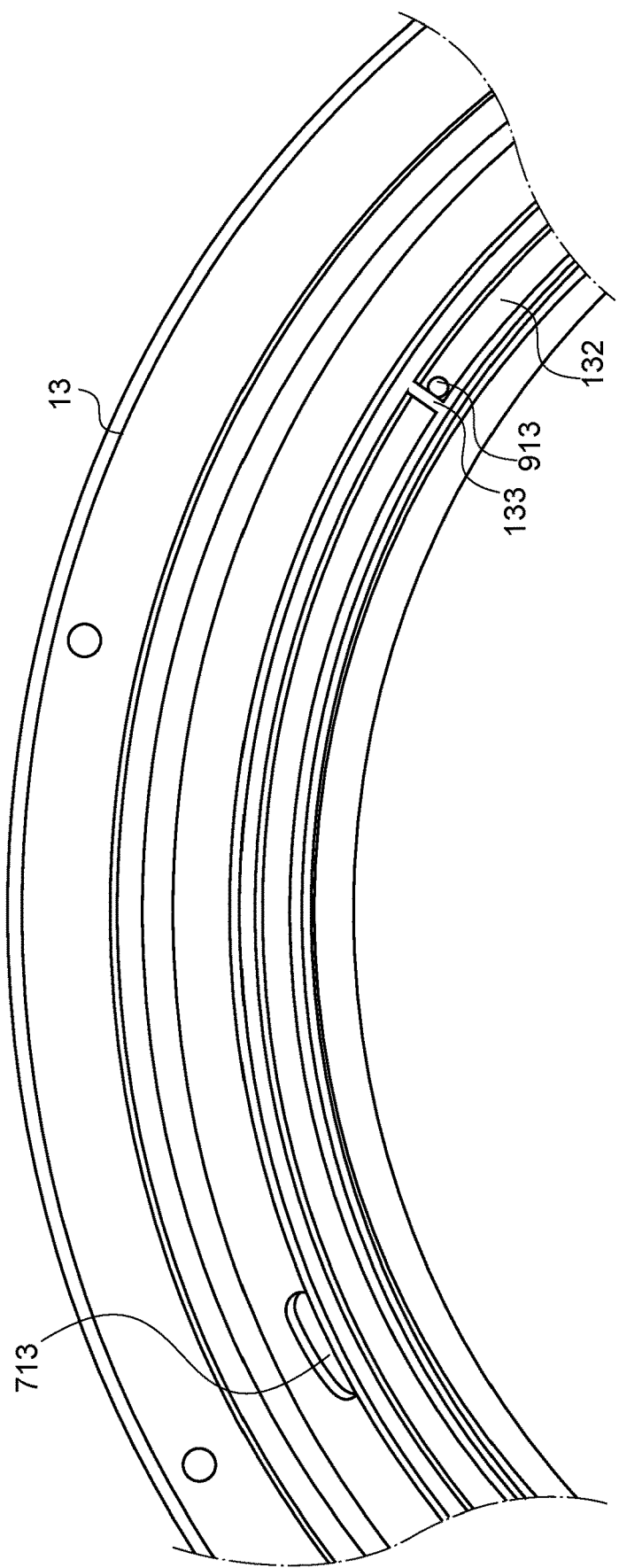
FIG. 7 is a detail three-dimensional view of a stator that can be used in the embodiment of FIG. 6.

FIG. 7 is a partial three-dimensional view of a stator of the third housing part 13 of FIG. 6. The third housing part 13 comprises a third inner groove 132, which forms the second buffer jacket portion 92 in combination with a facing groove of the second housing part 12. A barrier 133 is arranged in the third inner groove 132, and a facing barrier is provided in the facing groove of the second housing part 12. The clean fluid can thus not cross, or hardly cross, the barrier 133 and the corresponding facing barrier. The third hole for clean fluid 913, which is the inlet for clean fluid into the second buffer jacket portion 92 is situated next to the barrier, on one side of said barrier. To force the clean fluid to flow around the housing, the outlet of the second buffer jacket portion 92 (i.e. the second hole for clean fluid 912 made in the second housing part 12) is situated on the other side of the barrier 133.

Figure 8:
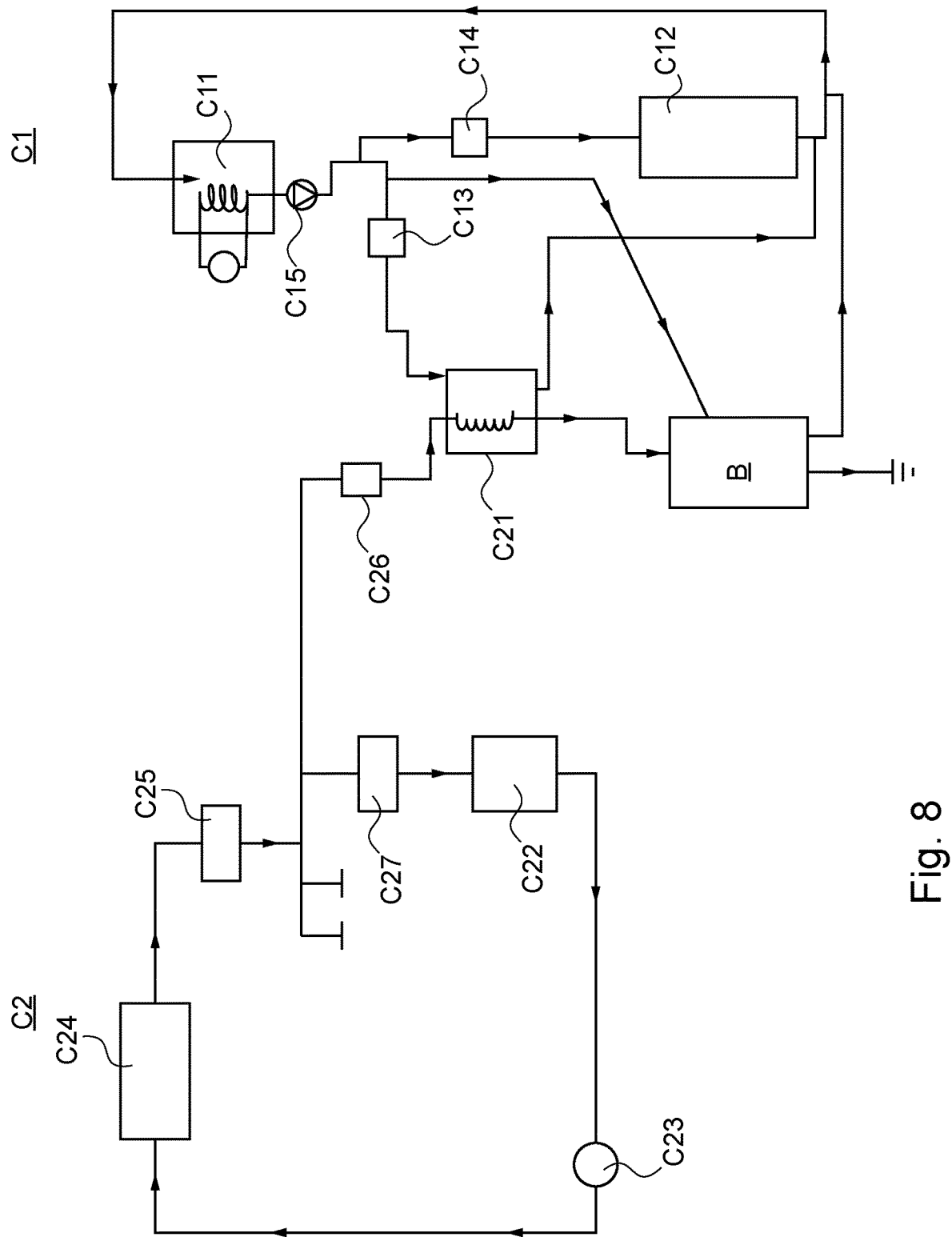
FIG. 8 is a schematic representation of an example of the fluid circuits that can be used in a system comprising an apparatus for mixing a liquid or pasty product according to the invention.

FIG. 8 is a schematic representation of an example of the fluid circuits that can be used in a system comprising an apparatus for mixing a liquid or pasty product according to the invention.

The fluid circuit essentially comprises two sub-circuits, namely an ice-cold water circuit C1 and a steam and condensed water circuit C2.

The ice-cold water circuit C1 is a closed circuit mainly used as source of coolant fluid for the apparatus for mixing a liquid or pasty product B. The ice-cold water circuit C1 comprises an ice-cold water generator C11. Ice-cold water exits from said ice-cold water generator C11. The ice-cold water issued from the ice-cold water generator C11 is then split into several streams. The main stream feeds the cooling jacket of the apparatus for mixing a liquid or pasty product B. A secondary stream is directed to a condenser C21 of the condensed water circuit C2 to be used as coolant to cool water steam and change it, as hereafter described, into condensed water. A first regulator C13 equips the duct transporting this second stream to regulate the amount of water flowing in this branch of the circuit. Other streams may be used to feed other devices, e.g. other apparatuses for mixing a liquid or pasty product. In the represented example, a third stream of ice-cold water is formed, which is transported to a heat exchanger C12 (or other device which requires cold water). A second regulator C14 equips the duct transporting this second stream to regulate the amount of water flowing in this branch of the circuit.

The duct coming out of the cooling jacket of the apparatus for mixing a liquid or pasty product B, the duct coming out of the condenser C21 for transporting the water used as coolant, and the duct coming out of the cooler C12 meet to form a single return duct to the inlet of the ice-cold water generator C11.

A pump C15 is installed downstream of the ice-cold generator to make the water flow in the ice-cold water circuit C1.

The steam and condensed water circuit C2 is used to provide sterile condensed water to the buffer jacket of the apparatus for mixing a liquid or pasty product B. The steam and condensed water circuit C2 is, in the represented embodiment, an "open" circuit, in that the condensed water, which comes out of the buffer jacket, is discarded. The quantity of discarded water can be low, due to the small dimensions of the buffer jacket and the small stream that is necessary in the buffer jacket. For example, between 10 L and 20 L per hour can be discarded. Discarding this water eases the detection of an inner seal defect of the apparatus as above explained. Of course, in other embodiments, this water could be collected and recycled or re-used, as long as the parameter making it possible to detect a product leakage in this water (typically its color) can be controlled. The steam and condensed water circuit C2 comprises a water steam loop. This loop comprises a sterilizer C22, followed by a steam compressor C23, a heater C24. Steam coming out of the heater C24 may reach for example a pressure of 15 bar. A pressure regulator C25 is installed downstream of the heater C24 to reduce the pressure of the steam, for example to 6 bar. The steam is split in two or more streams after the pressure regulator C25. A part of the stream is brought to the condenser C21 after its pressure has been further reduced to 1 bar in a second pressure regulator C26. The steam is cooled by heat exchange with ice-cold water in the condenser C21. This changes the steam into sterile condensate water, which feeds the buffer jacket of the apparatus for mixing a liquid or pasty product B. At the outlet of the condenser, the condensate water can be for example around 10° C. Another part of the steam coming out of the pressure regulator C25 is brought to the inlet of the sterilizer C22, after its pressure has been further reduced for example to 5 bar in a third pressure regulator C27. Other water steam streams can be created downstream of the pressure regulator C25, for example to feed other apparatuses for mixing a liquid or pasty product.

It should be appreciated that various embodiments of apparatuses can be built according to the present invention.

Various configurations of sets of a rotor and a stator as well as various configurations of housings may be used in apparatuses according to various embodiments of the invention. The apparatus can comprise a secondary product injector for introducing a secondary product into the intermediate chamber.

The mixing apparatus of the invention may advantageously be used for the aeration of pasty products in a wide variety of applications, for example in the food, pharmaceutical or cosmetic industries. Particular applications are for the mixing of liquid, semi-liquid and semi-solid foodstuffs, for instance in the aeration of dairy products, confectionery, ice cream or other liquid, semi-liquid and semi-solid foodstuffs.

In other embodiments, the invention provides a method of mixing a liquid or pasty product, preferably a foodstuff, using a mixing apparatus as described herein above.

The invention claimed is:

1. An apparatus for mixing a liquid or pasty product, the apparatus comprising a housing, said housing comprising an inlet for the liquid or pasty product to be mixed and an outlet for the mixed liquid or pasty product, and at least one set of a rotor and a stator for mixing the liquid or pasty product,
   the apparatus comprising at least a first housing part and a second housing part,
   the first housing part being assembled to the second housing part,
   the assembly of the first housing part and the second housing part forming a housing inner space between the inlet and the outlet where the liquid or pasty product flows,
   the assembly of the first housing part and the second housing part forming a cooling jacket for circulation of a coolant fluid around the housing inner space, and
   the assembly of the first housing part and the second housing part forms a buffer jacket for circulation of a clean fluid, the buffer jacket being formed between the cooling jacket and the housing inner space.

2. An apparatus for mixing a liquid or pasty product according to claim 1, wherein
   an inner seal is interposed, at an interface between the first housing part and the second housing part, between the housing inner space and the buffer jacket,
   a middle seal is interposed, at an interface between the first housing part and the second housing part, between the buffer jacket and the cooling jacket; and
   an outer seal is interposed, at an interface between the first housing part and the second housing part, between the cooling jacket and ambient air outside the apparatus.

3. An apparatus for mixing a liquid or pasty product according to claim 1, wherein the buffer jacket has an average thickness which is less than the average thickness of the cooling jacket.

4. An apparatus for mixing a liquid or pasty product according to claim 1, wherein the housing inner space is generally cylindrical, the buffer jacket has a ring-shaped cross section and surrounds the housing inner space, and the cooling jacket has a ring-shaped cross section and surrounds the buffer jacket.

5. An apparatus for mixing a liquid or pasty product according to claim 1, wherein it comprises a third housing part, such that:
the assembly of the first housing part and the second housing part forms a first portion of the buffer jacket,
an assembly of the second housing part and the third housing part forms a second portion of the buffer jacket; and
and wherein the first portion of the buffer jacket is in fluid communication with the second portion of the buffer jacket.

6. An apparatus for mixing a liquid or pasty product according to claim 5, wherein it is configured so that a stream of clean fluid is established all around the housing, a second hole forming the inlet of the first portion of the buffer jacket and the outlet of the second portion of the buffer jacket, said second hole being radially opposite a first hole forming the outlet of the first portion of the buffer jacket and said second hole being radially opposite a third hole forming the inlet of the second portion of the buffer jacket.

7. An apparatus for mixing a liquid or pasty product according to claim 5, wherein each portion of the buffer jacket comprises a barrier, an inlet in each portion of the buffer jacket being situated next to the barrier, on one side of said barrier, and an outlet of that portion of the buffer jacket being situated on the other side of said barrier.

8. An apparatus for mixing a liquid or pasty product according to claim 1, wherein it comprises a plurality of sets of a rotor and a stator, each stator being provided in a separate housing part of the apparatus, each housing part in which a stator is formed being assembled to at least one adjacent housing part.

9. A system comprising an apparatus for mixing a liquid or pasty product, the apparatus comprising a housing, said housing comprising an inlet for the liquid or pasty product to be mixed and an outlet for the mixed liquid or pasty product, and at least one set of a rotor and a stator for mixing the liquid or pasty product,
the apparatus comprising at least a first housing part and a second housing part,
the first housing part being assembled to the second housing part,
the assembly of the first housing part and the second housing part forming a housing inner space between the inlet and the outlet where the liquid or pasty product flows,
the assembly of the first housing part and the second housing part forming a cooling jacket for circulation of a coolant fluid around the housing inner space, and
the assembly of the first housing part and the second housing part forms a buffer jacket for circulation of a clean fluid, the buffer jacket being formed between the cooling jacket and the housing inner space, wherein the system further comprises:
a source of coolant fluid providing cooling fluid to the cooling jacket; and
a source of clean fluid providing clean heat-conducting fluid to the buffer jacket.

10. A system according to claim 9, wherein the source of coolant fluid is a coolant closed circuit comprising a cooling device configured to cool the coolant fluid flowing from an outlet of the cooling jacket thus forming cooled coolant fluid and to provide the so obtained cooled coolant fluid to an inlet of the cooling jacket.

11. A system according to claim 9, wherein the clean fluid flows in an open circuit.

12. A system according to claim 9, wherein the clean fluid is condensate water.

13. A system according to claim 12, wherein the source of clean fluid comprises a steam production circuit and a condenser.

14. A system according to claim 13, wherein the condenser is configured for heat exchange between steam issued from the steam production circuit and the coolant fluid.

* * * * *